Figure 1:
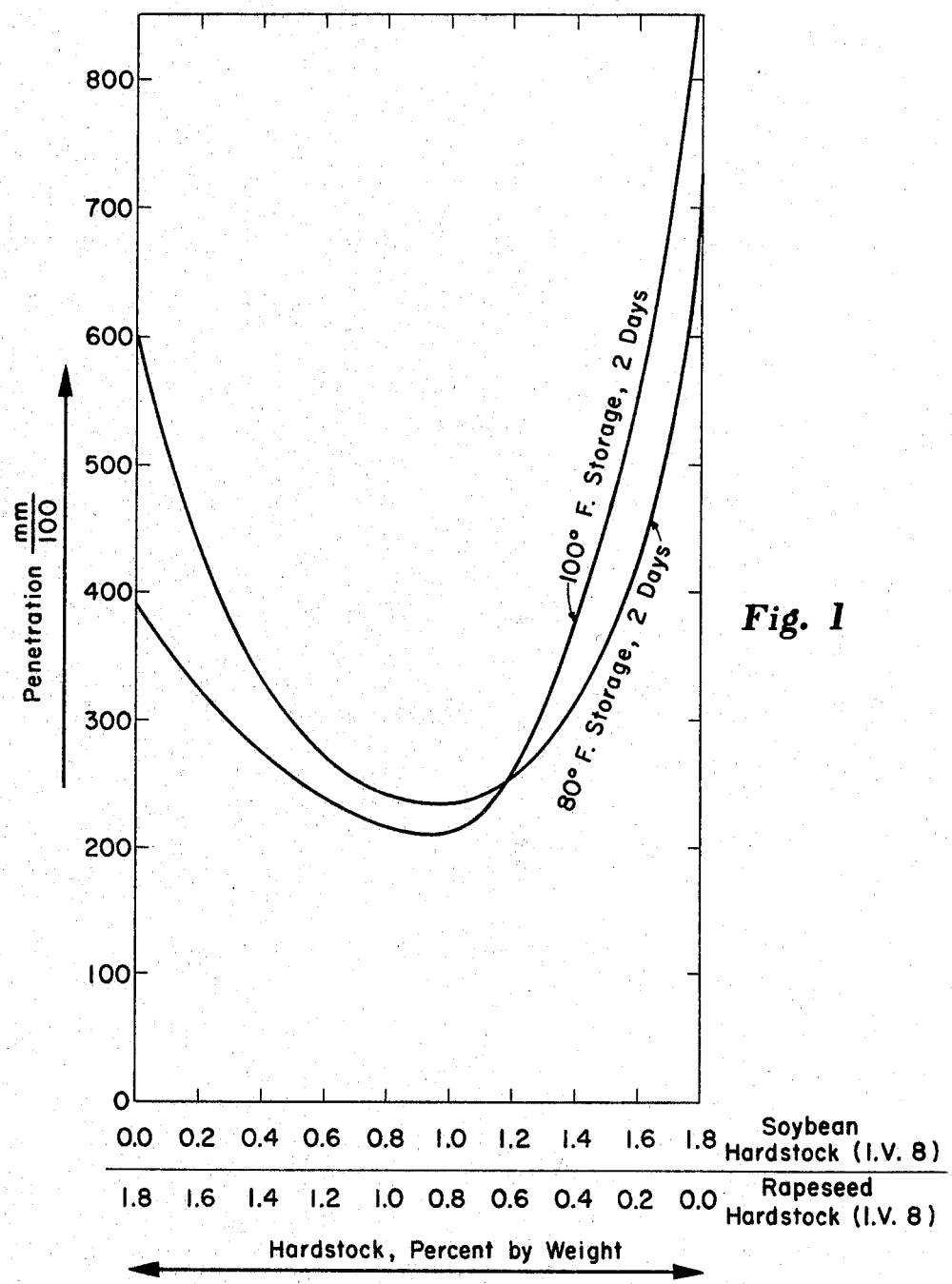

United States Patent Office 3,265,507
Patented August 9, 1966

3,265,507
FLAVOR IMPROVED PEANUT BUTTER
Cornelis H. Japikse, Springfield Township, Hamilton County, Ohio, assignor to The Procter & Gamble Company, Cincinnati, Ohio, a corporation of Ohio
Filed Nov. 2, 1964, Ser. No. 408,243
14 Claims. (Cl. 99—128)

This invention relates to stabilized peanut butter. More particularly, the invention relates to improved stabilized peanut butter having an enhanced flavor accessibility which promotes rapid flavor release in the mouth to give a high impact of peanut flavor.

It is known that peanut butter consists of a mixture of solid nut particles and liquid peanut oil which is generally made by roasting and blanching raw peanut kernels and then grinding them. The grinding operation breaks the cellular structure of the peanut kernels and liberates oil in which the comminuted nut particles are suspended to form a product having a pasty and spreadable consistency. Upon standing for a period of time, the solid and liquid phases of this product tend to separate, the oils forming a layer on top of the solid constituents. This tendency of peanut butter to separate on standing can be overcome to some extent by the use of suitable stabilizers such as by incorporating in the peanut butter partially hydrogenated or highly hydrogenated fats and oils. Examples of such stabilizers are described by Stockton, U.S. Patent 1,395,934, granted Nov. 1, 1921, Avera, U.S. Patent 2,504,620, granted March 11, 1949, Mitchell, U.S. Patent 2,521,243, granted Sept. 5, 1950, Mitchell, U.S. Patent 2,562,630, granted July 31, 1951, and Sanders, U.S. Patent 3,129,102, granted Apr. 14, 1964. Other known means for preventing excessive separation of oil and gravitation of solid constituents in peanut butter consist of special processing in the presence of suitable stabilizers, either to produce a plurality of intracongealed solid or semi-solid disassociated units which do not intercongeal upon standing such as described by Avera, U.S. Patent 2,552,925, granted May 15, 1951, or by freezing and reheating in process or in containers such as described by Avera, U.S. Patent 2,688,554, granted Sept. 7, 1954. It is common procedure to add to these peanut butters flavor enhancers such as salt and sweeteners.

Although methods or stabilizing peanut butter such as described above have been found useful for retarding the separation of solid and liquid phases and for enhancing the softness and spreadability of peanut butter, they have not provided the desired flavor release and flavor impact in the mouth during eating. As is well known to those skilled in the art of making peanut butter, the peanut flavor resides in the solid constituents rather than in the liquid phase of the peanut butter. The intense comminution of the nut particles to provide the desired pasty and spreadable consistency, combined with the above-described stabilization against oil separation, distributes the solid and liquid phases in such a manner as to disperse the solid flavor carriers of the peanuts to such an extent that the end product is appreciably deficient in flavor.

It is an object of this invention to provide an improved peanut butter having an enhanced flavor accessibility which promotes rapid flavor release in the mouth to give a high impact of peanut flavor.

It is another object to provide a flavor improved peanut butter which has a soft, spreadable consistency and which is stable against the effects of time and temperature.

It has been found that the foregoing objects can be accomplished by homogeneously dispersing in the peanut butter from about 1% to about 5%, by weight, of substantially completely hydrogenated hardstock having an iodine value not exceeding about 12, said substantially completely hydrogenated hardstock consisting essentially of a blend of (a) beta-phase-tending hardstock and (b) non-beta-phase-tending hardstock having a substantial proportion of fatty acid groups having from 20 to 24 carbon atoms, in a weight ratio of from about 3:7 to about 7:3. The mixture of the peanut butter and the above hardstock blend is heated to about 125° F. to about 180° F. to completely melt the solid triglyceride additives and then rapidly chilled to a temperature below about 115° F. in less than about 60 seconds to crystallize the hardstock into predominantly (at least about 70%) beta-phase crystals.

Figure 2:
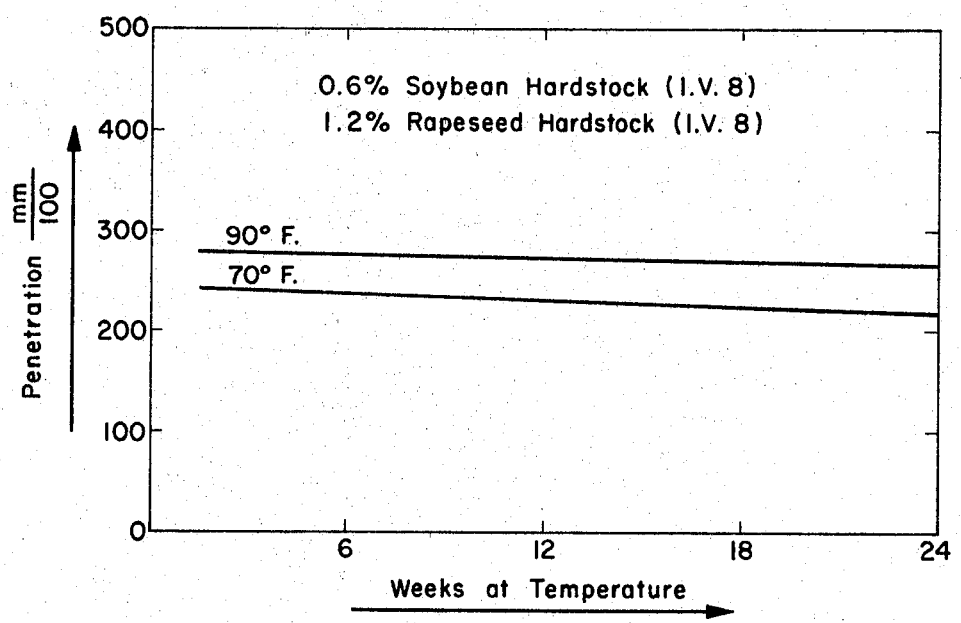
Figure 3:
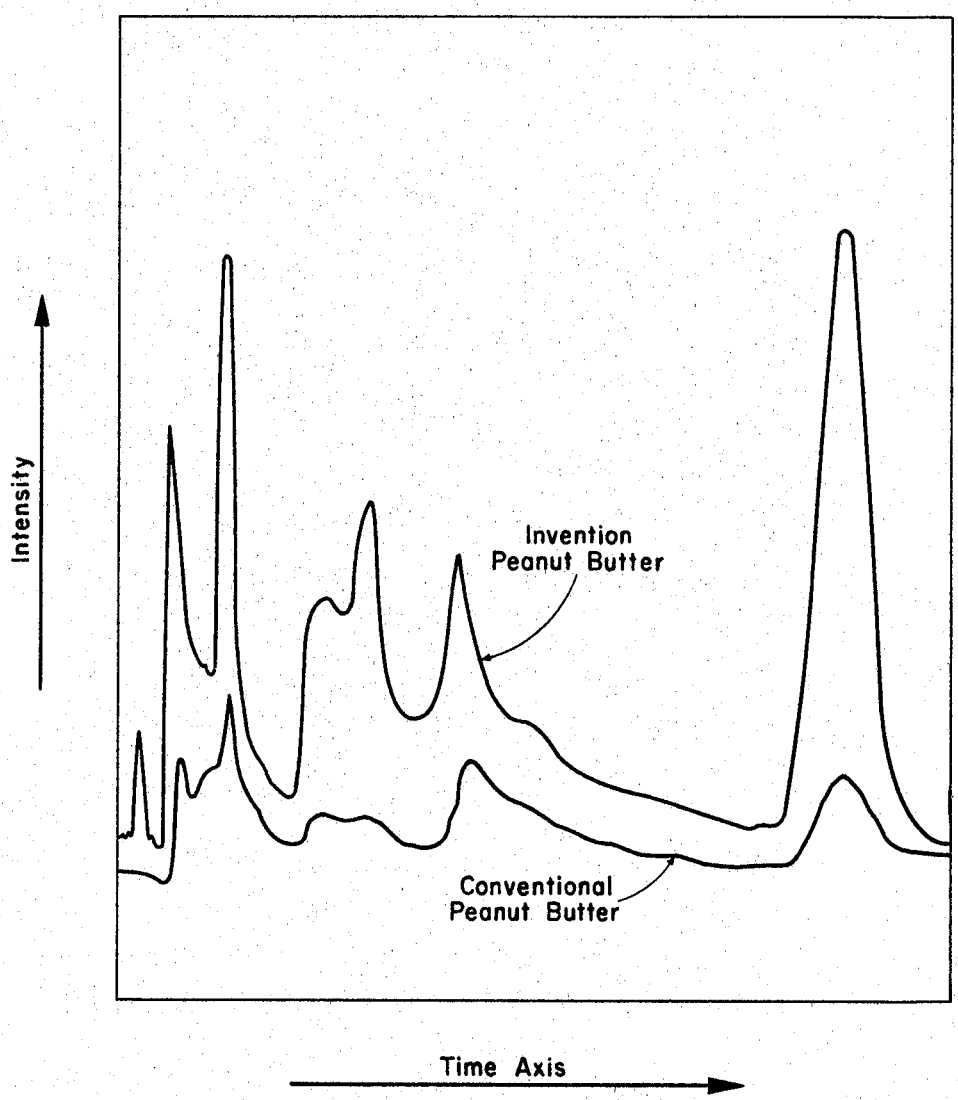

In the accompanying drawings, FIGURE 1 shows a plot of the penetration vs. hardstock composition for several peanut butters; FIGURE 2 shows a plot of penetration changes with age for peanut butter at several temperatures; and FIGURE 3 shows comparative flavor release gas chromatograms for two peanut butters.

It is known that triglyceride fats tend to exist in one of several different crystalline phases. These crystalline phases have been denoted alpha, beta prime, and beta. A description of the nomenclature and determination of these polymorphic crystalline phases is set forth in Mitchell, U.S. Patents 2,521,242–3, granted September 5, 1950 and in an article written by Edwin S. Lutton, 67 J. Amer. Chem. Soc. 524 (1945). The particular crystalline phase of a fat can be readily determined by X-ray diffraction patterns.

As used herein, the term "beta-phase-tending" defines an overall general tendency of certain triglyceride solids to crystallize in beta-phase, and the term "non-beta-phase-tending" defines an overall general tendency of certain other triglyceride solids to crystallize in a phase other than beta-phase. This does not mean, however, that under suitable conditions such triglyceride solids cannot be transformed from one crystalline phase to the other.

It has been found that by using the above blend of hardstocks in the peanut butter and by rapidly transforming the crystalline phase of the triglyceride solids to beta-phase in-process, a peanut butter having a soft, spreadable consistency and enhanced flavor accessibility can be prepared.

A suitable test for determining the relative consistency of peanut butter is the penetration test. The penetration test is done with the aid of a grease penetrometer according to A.S.T.M. method D217–52T. Penetration values are obtained by placing a standard grease cone on the surface of the sample to be penetrated and measuring the number of hundredths of a millimeter the cone penetrates the sample in 5 seconds. The peanut butter is tested for consistency as determined by penetration after the temperature of the sample is brought to 70° F. when it has been stored at higher or lower temperatures. For purposes of this invention, a Precision Scientific A.S.T.M. Penetrometer with a 47 gram cone on a 9-inch shaft, the cone measuring 2 inches x $19/32$ inch, was used. Using this instrument, the desired range for penetration is between about 200 and about 300.

In FIGURE 1 of the drawings, penetration values obtained with peanut butter according to the above test are plotted against the hardstock composition of the peanut butter. FIGURE 1 shows two series of peanut butter samples of this invention, one in which the peanut butter was stored at 80° F. for two days and the other in which the peanut butter was stored at 100° F. for two days prior to returning the samples to 70° F. for the penetration test. The total hardstock content of the peanut butter was 1.8% by weight and consisted of varying proportions of soybean and rapeseed oil hardstocks. The soybean hardstock (substantially completely hydrogenated soybean oil having an iodine value—I.V.—of 8) is representative of the beta-phase-tending hardstock of this invention; and the rapeseed hardstock (substantially completely hydrogenated rapeseed oil having an iodine value of 8) is representative of the non-beta-phase-tending hardstock having a substantial proportion of fatty acid groups having from 20 to 24 carbon atoms.

In FIGURE 1 it can be seen that irrespective of the storage temperature of the peanut butter, i.e., 80° F. or 100° F., the products containing either all soybean hardstock or all rapeseed hardstock had penetration values substantially higher than the desired 200 to 300 range. Upon blending together these two different hardstocks a parabolic function is traced out with a minimum at about the 1:1 blend. Although some variation in either direction will be obtained, in general, the desired penetration range of about 200 to about 300 is obtained by blending beta-phase-tending and non-beta-phase tending hardstocks, respectively, in a weight ratio of from about 3:7 to about 7:3.

FIGURE 2 of the drawings shows the penetration changes with age for peanut butter of this invention when stored at 70° F. and 90° F., respectively, for periods of time up to 24 weeks. The total hardstocks of the peanut butter was 1.8% by weight and consisted of 0.6% and 1.2%, respectively, of substantially completely hydrogenated soybean and rapeseed oils. The relatively constant penetration values obtained after the storage period at these temperatures demonstrate the excellent stability of the peanut butter of this invention against the effects of time and temperature.

The preferred beta-phase-tending hardstock component of this invention is substantially completely hydrogenated soybean oil having an iodine value of about 8. Examples of other beta-phase-tending triglyceride hardstocks which can be used in the practice of this invention are tristearin, tripalmitin, and symmetrical palmitodistearin. Hard fats which have been subjected to molecular rearrangement and hydrogenation processes whereby a major amount of tristearin or tripalmitin, for example, is caused to be present in the rearranged product can also be used. Other suitable triglyceride hardstocks having strong beta-forming tendencies can be derived from substantially completely hydrogenated fats and oils such as lard, sunflower seed oil, safflower seed oil, linseed oil, sesame seed oil, hazelnut oil, soybean oil, peanut oil, olive oil, corn oil, and other substantially completely hydrogenated fats and oils containing a substantial proportion of fatty acid groups having at least 8 carbon atoms.

The preferred non-beta-phase-tending hardstock component of this invention is substantially completely hydrogenated rapeseed oil having an iodine value of about 8. This material tends to crystallize in the beta-prime phase and is known to hinder the formation of beta-phase crystals in conventional plastic triglyceride compositions. Its use in a beta-prime type peanut butter is disclosed in Sanders, U.S. Patent 3,129,102, granted April 14, 1964. Unexpectedly, it has been found that substantially completely hydrogenated rapeseed oil in combination with beta-phase-tending hardstock in the aforesaid proportions provides a desirable beta-phase peanut butter having a soft, spreadable consistency and enhanced flavor accessibility. Other non-beta-phase-tending hardstocks which can be used in the practice of this invention are substantially completely hydrogenated fats and oils having a substantial proportion of fatty acid groups having 20 to 24 carbon atoms such as mustard seed oil and fish oils such as salmon, herring, pilchard, whale, menhaden and sardine oils.

A preferred range of total hardstock is from about 1% to about 2%, by weight, and a preferred weight ratio of beta-phase-tending to non-beta-phase-tending hardstock is from about 2:3 to about 3:2.

The flavor improvements of the peanut butter of this invention can be subjectively determined by tasting the product in the mouth and such determinations have been made by a panel of experts who have made comparisons with conventional peanut butters available on the market.

A test has also been devised for providing an objective showing of the rapid peanut flavor impact in the mouth obtained with the peanut butter of this invention. The rapidity with which flavor is released in the mouth from a peanut butter is measured by gas chromatography. The faster the release, the better the flavor impact which is obtained.

FIGURE 3 of the drawings shows comparative flavor release gas chromatograms for a commercially available conventionally stabilized peanut butter vs. the peanut butter of this invention (Example 1, below). Using the principle of the gas chromatograph, minute quantities of the material to be analyzed are injected into a column which is packed with an adsorbent. The material to be analyzed is volatilized and swept through the column with a constant flow of a carrier gas. The components of the material are adsorbed on the column and subsequently released and flushed out by the carrier gas. The retention time of the different components of the material to be analyzed varies. As a result, the different components emerge from the column at different times from injection, although they all entered the column at the same time. At the column outlet the components are burned in a hydrogen flame which changes in temperature every time a new component emerges from the column. These temperature changes (intensity) are registered on a recorder (usually scaled in millivolts) as "peaks." The amount of each component is a function of peak height or area under each peak. In FIGURE 3, the amount of flavor which is released during the first 30 seconds contact with saliva in the mouth is represented by the peaks in the curves. The area under the peaks is directly proportional to the amount of flavor released. The overall peanut butter flavor consists of a multitude of components, several of which are represented in FIGURE 3. The substantially higher peaks and greater area under the peaks of the curve for the peanut butter of this invention compared to the conventional peanut butter shows the superior flavor release and flavor impact obtained with this invention. For example, it is noted that in the last set of peaks on the time axis, the peak height for the peanut butter of this invention is about 6–7 times the peak height for the conventional peanut butter.

The specific procedure used in the gas chromatography analysis was as follows:

Three grams of the peanut butter sample to be analyzed was vigorous mixed with 7 ml. of a pH 7 buffer solution in a 60 ml. stoppered glass bottle for 30 seconds at room temperature. The suspension was then immediately emptied onto a small, coarse filter paper and one microliter of the first portion of the filtrate was injected into a gas chromatograph. The chromatograph was equipped with a 5 foot stainless steel column, packed with 20% "Apiezon M" on 60/80 "Chromosorb W." The carrier gas was nitrogen; the inlet port was kept at 200° C. and the column at 160° C. The detector was a flame ionization chamber. The chromatograms in FIGURE 3 shows an average of three samples of each of the two comparative peanut butters. Similar superior results of the peanut butter of this invention were obtained in comparisons with three other commercially available peanut butters.

In order to obtain the above flavor improved peanut butter it is essential to process the peanut butter by heating to about 125° F. to about 180° F. and then rapidly chilling to a temperature below about 115° F., and preferably to a temperature of from about 55° F. to about 100° F., in less than about 60 seconds and preferably in less than about 45 seconds. Such treatment provides a rapid in-process transformation to beta-phase crystals of very fine particle size ranging from less than 1 to about 5 microns for the individual crystals. Prior practice for producing plastic triglyceride compositions in the beta-phase has generally required tempering at temperatures of 90° F. or higher for one to two days and has resulted in a beta-phase particle size substantially greater than the 1 to 5 micron size of this invention. The peanut butter of this invention immediately after chilling has been stored at various temperatures ranging from about 50° F. to about 100° F. with no noticeable effect upon the beta-phase crystal structure.

Although it is not desired to be bound by any particular theory, it is believed that the formation of the very fine beta-phase crystals with the hardstock blend in the peanut butter of this invention produces a crystal matrix which gives good stability against oil separation due to temperature shock or outside mechanical influences as long as the peanut butter is in the container, but at the same time this matrix rapidly disintegrates when wetted in the mouth so that the peanut flavor is readily released.

The peanut butter of this invention incorporating the beta-phase-tending and non-beta-phase-tending hardstock blend, can contain other fatty triglycerides. Such materials include, for example, soybean oil, cottonseed oil, and peanut oil, either in natural form or in a hydrogenated and/or superglycerinated form. These other triglycerides preferably having iodine values greater than about 50.

Other additives such as salt, lecithin, and sweetening agents such as sucrose, dextrose, and honey, can also be present in the peanut butter.

The following examples will serve to illustrate the invention with greater particularity.

*Example 1*

A peanut composition was prepared by intimately blending together a mixture of the following ingredients:

Ingredients: Parts by weight
Finely ground roasted peanuts _____ 90.0
Finely ground sucrose _____ 1.7
Finely ground salt (NaCl) _____ 1.2
Honey _____ 1.0
Peanut oil (iodine value 107) _____ 1.0
Partially hydrogenated blend of soybean and cottonseed oils (iodine value 75) _____ 2.8
Substantially completely hydrogenated soybean oil (iodine value 8) _____ 0.9
Substantially completely hydrogenated rapeseed oil (iodine value 8) _____ 0.9

(a) 250 pounds of the above mixture was heated to 128° F. under agitation in a mixing tank to distribute the ingredients evenly and melt the glyceride solids. The mixture was then cooled to 70° F. in about 16 seconds in a scraped water heat exchanger (freezer) to crystallize into beta-phase the substantially completely hydrogenated soybean and rapeseed oils. Following this chilling step, the mixture was passed into an agglomerator (picker box) under agitation for 4 minutes. The mixture was then filled into 12 oz. jars and stored at 80° F. for 48 hours in a quiescent state. Penetration of the final peanut butter product was 274 mm./100 at 70° F. as determined with a Precision Scientific A.S.T.M. Penetrometer with a 47 gram cone on a 9-inch shaft, the cone having a diameter of 19/32 inch and a height of 2 inches.

The above procedure was repeated several times except that the initial heating temperatures, freezer outlet temperatures, and storage temperatures were varied as follows:

|     | Initial Heating Temperature, °F. | Freezer Outlet Temperature, °F. | Storage Temperature, °F. |
| --- | --- | --- | --- |
| (b) | 128 | 70 | 90 |
| (c) | 146 | 90 | 80 |
| (d) | 146 | 90 | 90 |
| (e) | 146 | 90 | 100 |
| (f) | 150 | 95 | 80 |
| (g) | 150 | 95 | 90 |
| (h) | 150 | 95 | 100 |

Penetration values of peanut butter products (b) through (h) were 285, 223, 208, 226, 242, 222, and 229, respectively. These are all excellent penetration values and lie within the 200–300 range desired according to this invention for soft spreadable consistency. These peanut butter products were tasted by a panel of experts and were found to provide a rapid peanut flavor impact in the mouth.

*Example 2*

In order to demonstrate the importance of the blend of beta-phase and the non-beta-phase-tending hardstock of this invention, Example 1 was essentially repeated except that the total hardstock consisted solely of 1.8 parts of beta-prime-phase-tending substantially completely hydrogenated rapeseed oil. The initial heating temperatures, freezer outlet temperatures, and storage temperatures used in this example were as follows:

|     | Initial Heating Temperature, °F. | Freezer Outlet Temperature, °F. | Storage Temperature, °F. |
| --- | --- | --- | --- |
| (a) | 156 | 90 | 80 |
| (b) | 156 | 90 | 90 |
| (c) | 156 | 90 | 100 |
| (d) | 164 | 95 | 80 |
| (e) | 164 | 95 | 90 |
| (f) | 164 | 95 | 100 |

Peanut butter products (a) and (d) were essentially soupy liquids and the other products in the group, (b), (c), (e) and (f), had undesirably high penetration values of 381, 391, 376 and 390, respectively. These products also had a substantially beta-prime crystalline phase instead of the beta crystalline phase of Example 1.

*Example 3*

In order to further demonstrate the importance of the blend of beta-phase and the non-beta-phase-tending hardstocks of this invention, Example 1 was essentially repeated except that the total hardstock consisted solely of 1.8 parts of beta-phase-tending substantially completely hydrogenated soybean oil. The initial heating temperatures, freezer, outlet temperatures, and storage temperatures, were as follows:

|     | Initial Heating Temperature, °F. | Freezer Outlet Temperature, °F. | Storage Temperature, °F. |
| --- | --- | --- | --- |
| (a) | 132 | 70 | 90 |
| (b) | 146 | 75 | 90 |
| (c) | 146 | 80 | 90 |
| (d) | 162 | 85 | 90 |
| (e) | 143 | 90 | 90 |
| (f) | 142 | 95 | 90 |

All of the peanut butter products of this example were essentially soupy liquids.

Example 4

In order to illustrate the importance of the hereindefined proportions of beta-phase and the non-beta-phase-tending hardstocks, Example 1 was essentially repeated except that the 1.8 parts of total hardstock consisted of a blend of 1.45 parts of substantially completely hydrogenated soybean oil and 0.35 part of substantially completely hydrogenated rapeseed oil instead of a blend of 0.9 part of each. This is equivalent to ratio of less than about 1 part of rapeseed hardstock to 4 parts of soybean hardstock. In this example the initial heating temperatures, freezer, outlet temperatures, and storage temperatures were as follows:

|     | Initial Heating Temperature, °F. | Freezer Outlet Temperature, °F. | Storage Temperature, °F. |
| --- | --- | --- | --- |
| (a) | 128 | 70 | 80 |
| (b) | 128 | 70 | 90 |
| (c) | 128 | 70 | 100 |
| (d) | 158 | 90 | 80 |
| (e) | 158 | 90 | 90 |
| (f) | 158 | 90 | 100 |
| (g) | 164 | 95 | 80 |
| (h) | 164 | 95 | 90 |
| (i) | 164 | 95 | 100 |

Peanut butter products (d), (e), and (f) were essentially soupy liquids and the other products in the group, (a) to (c) and (g) to (i), had undesirably high penetration values of 478, 483, 515, 332, 323, and 435, respectively.

Example 5

In order to show the importance of the long-chain $C_{20}$ to $C_{24}$ hardstock of this invention, several peanut butter samples were prepared with substantially completely hydrogenated cottonseed and peanut oils in place of the substantially completely hydrogenated rapeseed oil of this invention.

| Ingredients | Parts By Weight | | | |
| --- | --- | --- | --- | --- |
|  | (a) | (b) | (c) | (d) |
| Finely ground roasted peanuts | 92.5 | 92.5 | 92.5 | 92.5 |
| Finely ground sucrose | 1.7 | 1.7 | 1.7 | 1.7 |
| Finely ground salt (NaCl) | 1.2 | 1.2 | 1.2 | 1.2 |
| Peanut oil (iodine value 107) | 3.3 | 3.3 | 3.3 | 3.3 |
| Substantially completely hydrogenated soybean oil (iodine value 8) | 0.65 | 0.52 | 0.78 | 0.78 |
| Substantially completely hydrogenated cottonseed oil (iodine value 8) | 0.65 | 0.78 |  | 0.52 |
| Substantially completely hydrogenated peanut oil (iodine value 8) |  |  | 0.52 |  |

Using initial heating temperatures of 148° F. to 155° F. and freezer outlet temperatures of 95° F. to 105° F., the products were essentially soupy liquids.

Examples 6 through 9 illustrate further variations in the proportions of beta-phase and the non-beta-phase-tending hardstocks within the scope of this invention. The procedures and compositions used were essentially the same as in Example 1 except for the variations noted.

Example 6

The hardstock blend in this example consisted of 1.1 parts of substantially completely hydrogenated soybean oil and 0.7 parts of substantially completely hydrogenated rapeseed oil. The initial melting temperature was 162° F. and the freezer outlet temperature was 95° F. With storage temperatures of 80° F., 90° F. and 100° F., the penetration values were 230, 208, and 211, respectively.

Example 7

The hardstock blend in this example consisted of 0.8 parts of substantially completely hydrogenated soybean oil and 1.0 parts of substantially completely hydrogenated rapeseed oil. The initial melting temperature was 150° F. and the freezer outlet temperature was 95° F. With storage temperatures of 80° F., 90° F. and 100° F., the penetration values were 238, 210 and 224, respectively.

Example 8

The hardstock blend in this example consisted of 0.6 parts of substantially completely hydrogenated soybean oil and 1.2 parts of substantially completely hydrogenated rapeseed oil. The initial melting temperature was 168° F. and the freezer outlet temperature was 95° F. With storage temperatures of 80° F., 90° F., and 100° F., the penetration values were 295, 239, and 244, respectively.

Example 9

The hardstock blend in this example consisted of a blend of 0.9 parts each of substantially completely hydrogenated soybean and rapeseed oils. The initial peanut butter composition also contained 2.8 parts of soybean oil (iodine value 107) instead of the 2.8 parts of partially hydrogenated blend of soybean and cottonseed oils shown in Example 1. The initial melting temperature was 158° F. and the freezer outlet temperature was 95° F. With storage temperatures of 80° F., 90° F., and 100° F., the penetration values were 262, 253, and 278, respectively.

The final peanut butter products of Examples 6 through 9 showed rapid peanut flavor impact as in Example 1; the triglyceride solids were predominantly in beta-phase.

Example 10

Example 1 is repeated except that the total hardstock amount used is 4 parts, consisting of 2 parts each of substantially completely hydrogenated soybean and rapeseed oils, and the freezer retention time is 45 seconds. Penetration values of between 200 and 300 and crystallization predominantly in beta-phase as well as rapid flavor impact as in Example 1 are obtained.

When tristearin and tripalmitin are substituted for the substantially completely hydrogenated soybean oil and when substantially completely hydrogenated mustard seed oil is substituted for the substantially completely hydrogenated rapeseed oil in the above examples, substantially similar results are obtained as in the above examples.

Example 11

Roasted, blanched peanuts and sucrose, both at ambient temperatures, were fed continuously into a burrstone grinder to which at the same time a slurry was fed, which consisted of vegetable oil (iodine value 107), salt, lecithin and substantially completely hydrogenated vegetable oil (iodine value 8). The slurry was heated to temperatures of between about 140° F. to 160° F. The components of the slurry were mixed at such a rate that the final composition was obtained as follows:

| Components: | Percent by weight |
| --- | --- |
| Peanut paste | 90.0 |
| Sucrose | 1.7 |
| Salt (NaCl) | 1.2 |
| Honey | 1.0 |
| Lecithin | 0.5 |
| Soybean oil (iodine value 107) | 4.2 |
| Substantially completely hydrogenated soybean oil (iodine value 8) | 0.84 |
| Substantially completely hydrogenated rapeseed oil (iodine value 8) | 0.56 |
|  | 100.00 |

The above mixture was fed continuously in and out of a mixing tank in which it was held under agitation at temperatures of 140° F. to 160° F. for a residence time of about 30 minutes and then rapidly chilled to between 99.5° F. and 100.5° F. in two scraped wall heat exchangers in series in about 20 seconds. Immediately following this freezing step, the product was gently agitated in an agglomerator for four minutes, after which it was placed in jars and stored at various temperatures ranging from 50° F. to 100° F. After storage for 48 hours and 6 months, respectively, at these temperatures, the products were returned to 70° F. and penetration values were determined and are recorded in the following table. X-ray diffraction patterns in fresh product showed these products to range from 95% to 100% beta crystalline phase for all storage temperatures.

| Initial Mixing Temperature °F. | Freezer Outlet Temperature, °F. | Storage Temperature, °F. | 70° F. Penetration, mm/100. | |
|---|---|---|---|---|
| | | | Fresh (48-Hour Storage) | 6-Month Storage |
| 149 | 100 | 50 | 259 | (*) |
| 149 | 100 | 70 | 254 | (*) |
| 149 | 100 | 80 | 244 | (*) |
| 149 | 100 | 90 | 259 | 241 |
| 149 | 100 | 100 | 241 | (*) |
| 148 | 99.5 | 50 | 235 | (*) |
| 148 | 99.5 | 70 | 230 | (*) |
| 148 | 99.5 | 80 | 220 | (*) |
| 148 | 99.5 | 90 | 211 | (*) |
| 148 | 99.5 | 100 | 199 | (*) |
| 149 | 100.5 | 50 | 221 | (*) |
| 149 | 100.5 | 70 | 234 | (*) |
| 149 | 100.5 | 80 | 198 | 191 |
| 149 | 100.5 | 90 | 202 | 185 |
| 149 | 100.5 | 100 | 198 | (*) |
| 146 | 100 | 50 | 215 | (*) |
| 146 | 100 | 70 | 231 | (*) |
| 146 | 100 | 80 | 219 | 204 |
| 146 | 100 | 90 | 213 | (*) |
| 146 | 100 | 100 | 202 | (*) |

*Not tested.

Rapid peanut flavor impact in the mouth was obtained with the peanut butters of this example after 6 months storage as well as when fresh.

*Example 12*

In order to demonstrate the stability of the peanut butter of this invention against the effects of time and temperature, several samples were prepared according to the procedure of Example 1, using various proportions of hardstocks as shown below. The peanut butter samples were then stored at 70° F. and 90° F., respectively, for periods of time up to 24 weeks. Penetration values obtained before and after the storage time are shown below.

| Sample No. | Weight Percent Soybean Hardstock | Weight Percent Rapeseed Hardstock | Penetration Values | | | |
|---|---|---|---|---|---|---|
| | | | At 70° F. Storage | | At 90° F. Storage | |
| | | | Before | After | Before | After |
| (a) | 1.1 | 0.7 | 210 | 195 | 240 | 230 |
| (b) | 0.8 | 1.0 | 230 | 210 | 255 | 235 |
| (c) | 0.6 | 1.2 | 240 | 220 | 285 | 270 |
| (d) | 0.9 | 0.9 | 240 | 235 | 280 | 270 |

The very small drop in penetration during the 24 week storage period at these temperatures shows the excellent stability of the peanut butter of this invention against the effects of time and temperature.

Variations and modifications of the present invention can be made upon a study of the foregoing disclosure by those skilled in the art. Such variations and modifications are intended to be within the spirit and scope of this invention as defined in the appended claims.

What is claimed is:

1. A flavor improved stabilized peanut butter comprising a homogeneous mixture of particles of peanuts and peanut oil, said peanut butter having dispersed therein from about 1% to about 5%, by weight of the peanut butter, of substantially completely hydrogenated hardstock having an iodine value not exceeding about 12, said substantially completely hydrogenated hardstock consisting essentially of a blend of (a) beta-phase-tending hardstock and (b) non-beta-phase-tending hardstock having a substantial proportion of fatty acid groups having from 20 to 24 carbon atoms, in a weight ratio of from about 3:7 to about 7:3, at least about 70% of the hardstock triglyceride solids being in beta-phase.

2. The peanut butter of claim 1 in which the beta-phase-tending hardstock is substantially completely hydrogenated soybean oil.

3. The peanut butter of claim 1 in which the non-beta-phase-tending hardstock is substantially completely hydrogenated rapeseed oil.

4. The peanut butter of claim 1 in which the amount of substantially completely hydrogenated hardstock is from about 1% to about 2% by weight of the peanut butter.

5. The peanut butter of claim 1 in which the weight ratio of beta-phase-tending hardstock to non-beta-phase-tending hardstock is from about 2:3 to about 3:2.

6. A flavor improved stabilized peanut butter comprising a homogeneous mixture of particles of peanuts and peanut oil, said peanut butter having dispersed therein from about 1% to about 2%, by weight of the peanut butter, of a blend of substantially completely hydrogenated soybean and rapeseed oils in a weight ratio of from about 2:3 to about 3:2, at least about 70% of the hardstock triglyceride solids being in beta-phase.

7. The method of enhancing flavor accessibility in peanut butter to promote rapid flavor release in the mouth to give a high impact of peanut flavor which comprises adding to the peanut butter from about 1% to about 5%, by weight of the peanut butter, of substantially completely hydrogenated hardstock having an iodine value not greater than about 12, said substantially completely hydrogenated hardstock consisting essentially of a blend of (a) beta-phase-tending hardstock and (b) non-beta-phase-tending hardstock having a substantial proportion of fatty acid groups having 20 to 24 carbon atoms, in a weight ratio of from about 3:7 to about 7:3, said addition being carried out by thoroughly mixing said hardstocks with said peanut butter in a melted condition and then rapidly chilling the peanut butter mixture to a temperature below about 115° F. in less than about 60 seconds to crystallize the hardstock into predominantly beta-phase crystals.

8. The method of claim 7 in which the beta-phase-tending hardstock is substantially completely hydrogenated soybean oil.

9. The method of claim 7 in which the non-beta-phase-tending hardstock is substantially completely hydrogenated rapeseed oil.

10. The method of claim 7 in which the amount of substantially completely hydrogenated hardstock is from about 1% to about 2% by weight of the peanut butter.

11. The method of claim 7 in which the weight ratio of beta-phase-tending hardstock to non-beta-phase tending hardstock is from about 2:3 to about 3:2.

12. The method of claim 7 in which the peanut butter is rapidly chilled to a temperature of from about 55° F. to about 100° F.

13. The method of claim 7 in which the rapid chilling is accomplished in less than about 45 seconds.

14. The method of enhancing flavor accessibility in peanut butter to promote rapid flavor release in the mouth to give a high impact of peanut flavor which comprises adding to the peanut butter from about 1% to about 2%, by weight of the peanut butter, of a hardstock blend of substantially completely hydrogenated soybean and rapeseed oils in a weight ratio of from about 2:3 to about 3:2, said addition being carried out by thoroughly mixing said hardstocks with said peanut butter in a melted condition and then rapidly chilling the peanut butter mixture to a temperature of from about 55° F. to about 100° F. in less than about 45 seconds to crystallize the hardstock into predominantly beta-phase crystals.

References Cited by the Examiner
UNITED STATES PATENTS

| | | | |
|---|---|---|---|
| 2,521,219 | 9/1950 | Holman et al. | 99—118 |
| 2,521,243 | 9/1950 | Mitchell | 99—128 |
| 2,875,065 | 2/1959 | Thompson | 99—118 |
| 3,127,272 | 3/1964 | Baker et al. | 99—128 |
| 3,129,102 | 4/1964 | Sanders | 99—128 |

References Cited by the Applicant
UNITED STATES PATENTS

| | | |
|---|---|---|
| 1,395,934 | 11/1921 | Stockton. |
| 1,445,174 | 2/1923 | Rosenfield. |
| 2,504,620 | 3/1949 | Avera. |
| 2,552,925 | 5/1951 | Avera. |
| 2,562,630 | 7/1951 | Mitchell. |
| 2,688,554 | 9/1954 | Avera. |
| 2,911,303 | 11/1959 | Rowland et al. |

A. LOUIS MONACELL, *Primary Examiner.*

S. E. HEYMAN, *Assistant Examiner.*